US006998185B2

(12) United States Patent
Gore et al.

(10) Patent No.: US 6,998,185 B2
(45) Date of Patent: Feb. 14, 2006

(54) DYE-BASED FUEL INDICATOR SYSTEM FOR FUEL CELLS

(75) Inventors: Makarand P. Gore, Corvallis, OR (US); L. Chris Mann, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 390 days.

(21) Appl. No.: 10/044,507

(22) Filed: Jan. 11, 2002

(65) Prior Publication Data

US 2003/0134162 A1 Jul. 17, 2003

(51) Int. Cl.
*H01M 8/00* (2006.01)
*H01M 8/04* (2006.01)
*H01M 8/12* (2006.01)
*G01N 21/25* (2006.01)
*G01J 1/10* (2006.01)

(52) U.S. Cl. .......................... 429/13; 429/22; 356/409; 356/243.5

(58) Field of Classification Search .................. 429/13, 429/22, 23; 356/409, 425, 243.1, 243.5

See application file for complete search history.

(56) References Cited

U.S. PATENT DOCUMENTS

| 4,523,852 | A | * | 6/1985 | Bauer | 356/421 |
|---|---|---|---|---|---|
| 5,098,477 | A | * | 3/1992 | Vieira et al. | 106/31.27 |
| 5,192,984 | A | * | 3/1993 | Beecher et al. | 356/433 |
| 5,229,295 | A | | 7/1993 | Travis | |
| 6,326,097 | B1 | * | 12/2001 | Hockaday | 429/34 |
| 2001/0049045 | A1 | * | 12/2001 | Hockaday et al. | 429/34 |

FOREIGN PATENT DOCUMENTS

| EP | 0254780 | 2/1998 |
|---|---|---|
| EP | 1087455 | 3/2001 |

* cited by examiner

Primary Examiner—Patrick Joseph Ryan
Assistant Examiner—Julian Mercado

(57) ABSTRACT

A means for determining the concentration of a hydrogen-rich fuel in a fuel solution within the anode reservoir of a fuel cell. The fuel concentration is determined using a dye mixture responsive to fuel concentration within a fuel solution. As fuel is consumed, the fuel concentration decreases. As the fuel concentration decreases, the dye changes color. The resulting color changes occur within the anode reservoir of the fuel cell, or within a dye chamber in fluid contact with the anode reservoir, and are made visible by a window. A color strip and fuel scale may be included to facilitate fuel concentration determination based on the color of the fuel solution. Additionally, a valve responsive to dye color may act to control fuel delivery.

19 Claims, 7 Drawing Sheets

DYE-BASED FUEL INDICATOR SYSTEM FOR FUEL CELLS

TECHNICAL FIELD

The present invention relates to fuel cells, and, in particular, to a dye-based fuel indicator system for use with fuel cells.

BACKGROUND OF THE INVENTION

Fuel cells produce electrical energy by reacting a fuel with an oxidant, usually in the presence of a catalyst. Typically, fuel cells consist of a fuel electrode, or anode, and a reducing electrode, or cathode, separated by an ion-conducting electrolyte. An external circuit conductor connects the electrodes to an electrical circuit, or load. In the conductor, current is transported by the flow of electrons. In the electrolyte, current is transported by the flow of ions.

Any number of hydrogen rich fuels may be used as a fuel source, such as methanol, ethanol, butane, and propane. FIG. 1 is a diagram of a methanol fuel cell. A reservoir that includes the anode, or anode reservoir 102, contains a methanol-water solution 104. The methanol fuel cell generally is in a charged state when the percentage of methanol in the methanol-water solution is relatively large. As methanol is oxidized and electricity is generated by the fuel cell, the percentage of methanol in the methanol-water solution decreases and the fuel cell becomes depleted.

The methanol contained within the methanol-water solution is oxidized, usually in the presence of a catalyst, producing hydrogen ions 106, electrons 108, and carbon dioxide 116. This oxidation reaction occurs inside the anode reservoir 102 of the fuel cell. A primary anode oxidation reaction is shown below:

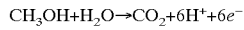

$$CH_3OH + H_2O \rightarrow CO_2 + 6H^+ + 6e^-$$

Note that, since the electrolyte is a relatively poor electrical conductor, electrons 108 flow away from the anode via an external circuit 110. Simultaneously, hydrogen ions 106 travel through the electrolyte, or membrane 112, to the cathode 114. Commonly used membranes include Nafion 112®, Nafion 117®, and polybenzimidazole.

At the cathode 114 of a fuel cell, oxygen 118 is reduced by hydrogen ions 106 migrating through the electrolyte 112 and incoming electrons 108 from the external circuit 110 to produce water 120. The primary cathode reaction is shown below:

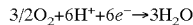

$$3/2 O_2 + 6H^+ + 6e^- \rightarrow 3H_2O$$

The individual electrode reactions, described above as primary anode and primary cathode reactions, result in an overall methanol-fuel-cell reaction shown below:

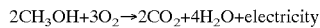

$$2CH_3OH + 3O_2 \rightarrow 2CO_2 + 4H_2O + \text{electricity}$$

Additional minor chemical reactions may occur, and thermal energy is generally produced.

Modern fuel cells can continuously produce electrical current for long periods of time without the need for recharging. However, fuel cells produce electrical charge only when fuel is present in the anode reservoir above a threshold concentration. Therefore, in order to ensure continuous operation of a fuel cell, an indication of the amount of fuel remaining in the fuel cell needs to be easily obtainable. Fuel cells commonly provide no convenient, cost-efficient means for reliably determining the amount of available fuel remaining in the fuel cell. Therefore, designers, manufacturers, and users of fuel cells have recognized the need for a convenient, cost-efficient means for determining the amount of fuel remaining in a fuel cell.

SUMMARY OF THE INVENTION

One embodiment of the present invention provides a means for determining the concentration of methanol within an anode reservoir of a methanol-based fuel cell. The methanol concentration is determined through the use of a dye mixture that responds to the concentration of methanol in the methanol-water solution. As methanol is consumed during normal operation of the fuel cell, the dye mixture responds by changing color. Thus, different colors are produced in the fluid within the anode reservoir of the fuel cell, or within a fluid-filled chamber, or dye chamber, in fluid communication with the anode reservoir, as methanol is consumed. A color indicator bar and fuel scale may be included with the fuel cell to facilitate determination of the methanol concentration by visual comparison of the color of the fluid in the anode reservoir, or within a dye chamber in fluid communication with the anode reservoir, with a corresponding color-indicator-bar color. Additionally, a valve responsive to the color of the dye mixture may act to control fuel delivery. Alternative embodiments employ different types of dye mixtures suitable for indicating concentrations of different types of hydrogen-rich fuels.

DETAILED DESCRIPTION OF THE PREFERRED EMBODIMENT

The present invention provides a means to determine the concentration of fuel within a fuel cell. In one embodiment, a dye mixture is introduced into the methanol-water solution contained in the anode reservoir, or a dye chamber in fluid communication with the anode reservoir, and is made visible through a transparent window. Normal operation of the fuel cell lowers the concentration of methanol within the methanol-water solution in the anode reservoir. As the concentration of methanol decreases, the dye mixture changes color. Consequently, the color of the methanol-water solution corresponds to the concentration of methanol in the methanol-water solution in the anode reservoir. A color comparison bar, or color strip, and a fuel scale may be included to facilitate methanol concentration determination based on the color of the methanol-water solution.

Figure 1:
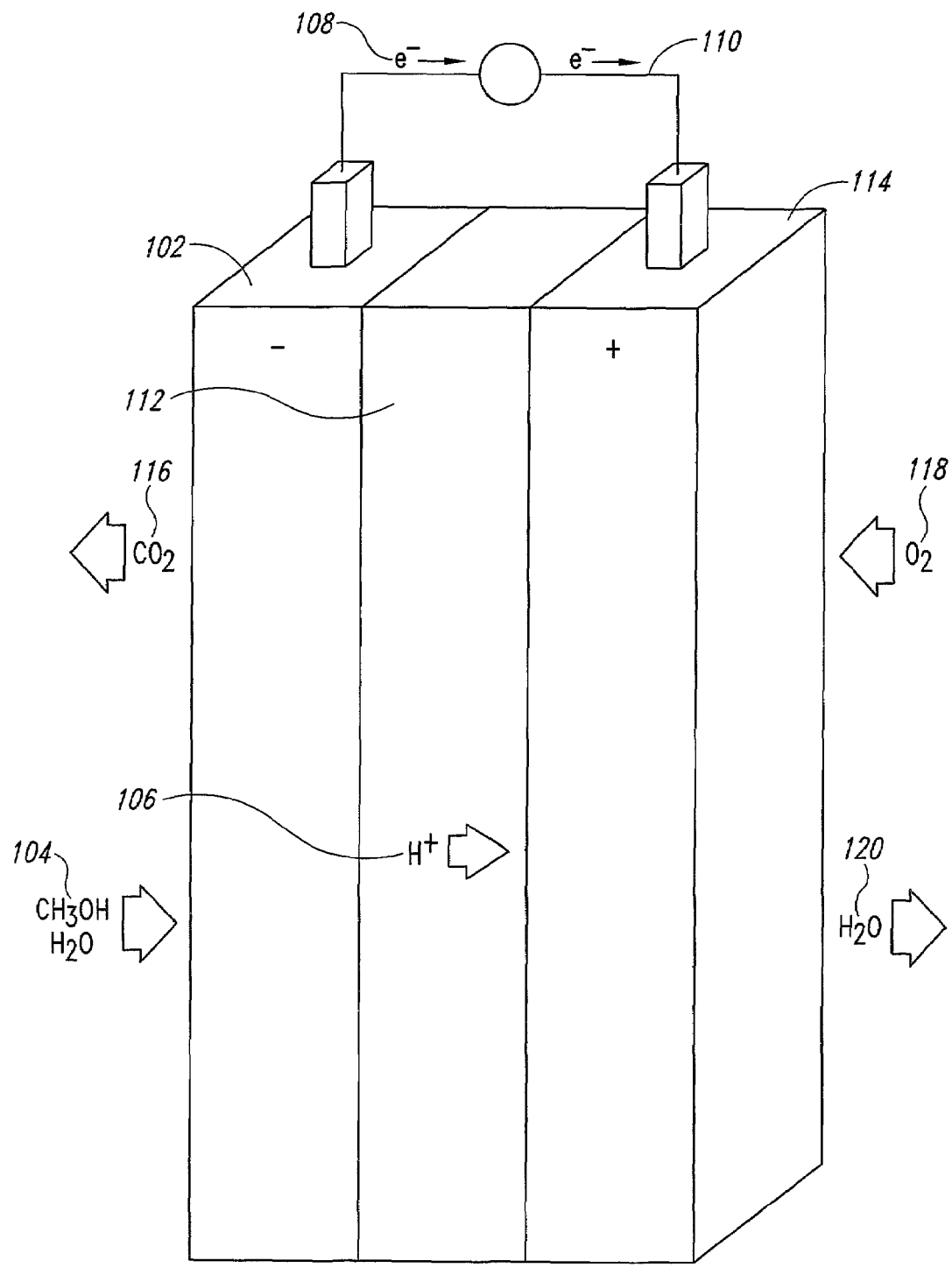
FIG. 1 is a diagram of a methanol fuel cell.
Figure 2A:
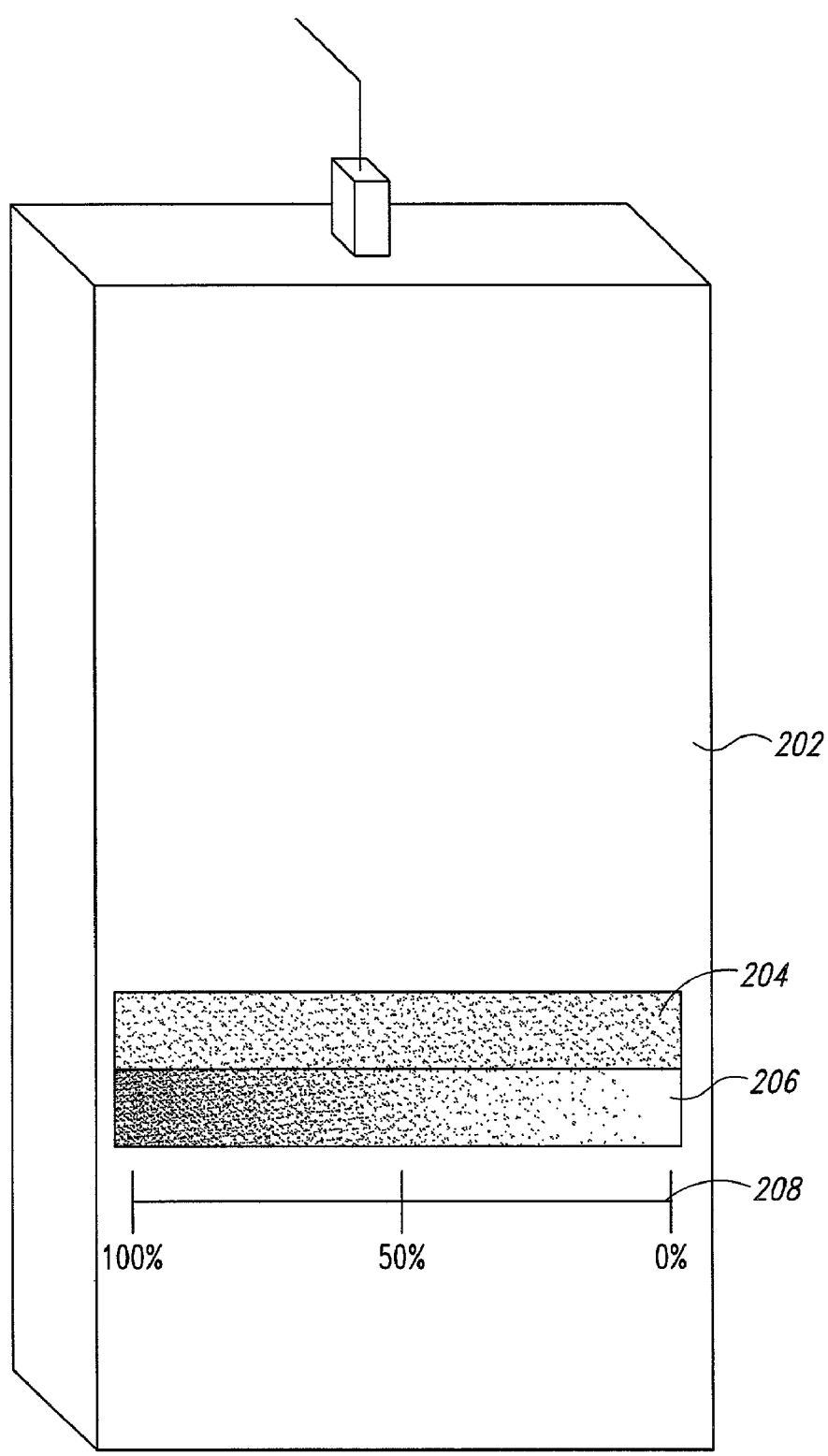
FIG. 2A shows a dye-based fuel indicator in direct contact with the anode reservoir.

FIG. 2A illustrates one embodiment of the present invention with a dye-based fuel indicator in direct contact with the anode reservoir 202. The anode reservoir 202 includes a long, thin horizontal window 204 visible from the exterior of the fuel cell. A color strip 206 and fuel scale 208, both affixed to the exterior of the fuel cell, extend along the lower, horizontal length of the window 204. The color strip 206 provides a convenient means to compare fluid color to calibrated colors displayed by the color strip 206 and aligned fuel scale 208. The colors on the color strip 206 encompass a range of possible colors produced by the dye mixture in methanol concentrations ranging between a charged state and a depleted state. The colors contained on the color strip 206 form a color gradient corresponding to numeric fuel concentration indications on the fuel scale 208. The fuel scale 208 is shown as a horizontal line with a series of evenly spaced marks, each mark representing a fuel concentration.

FIG. 2A shows fluid of a particular color visible through a window 204 in the anode reservoir 202. The fluid color can be compared to the colors displayed by the color strip 206 below the window 204. In FIG. 2A, the fluid color matches a color on the color strip 206 corresponding to a methanol concentration at which 20% of the available fuel supply remains.

In the above-described embodiment, shown in FIG. 2A, a dye is introduced directly into the anode reservoir 202. However, certain dye mixtures may interfere with operation of the fuel cell or may be too expensive to use in the bulk fuel mixture contained within the anode reservoir 202. Therefore, a dye chamber 210 may be employed to maintain a necessary concentration of dye molecules in a smaller volume of methanol-water solution separate from the anode reservoir 202.

Figure 2B:
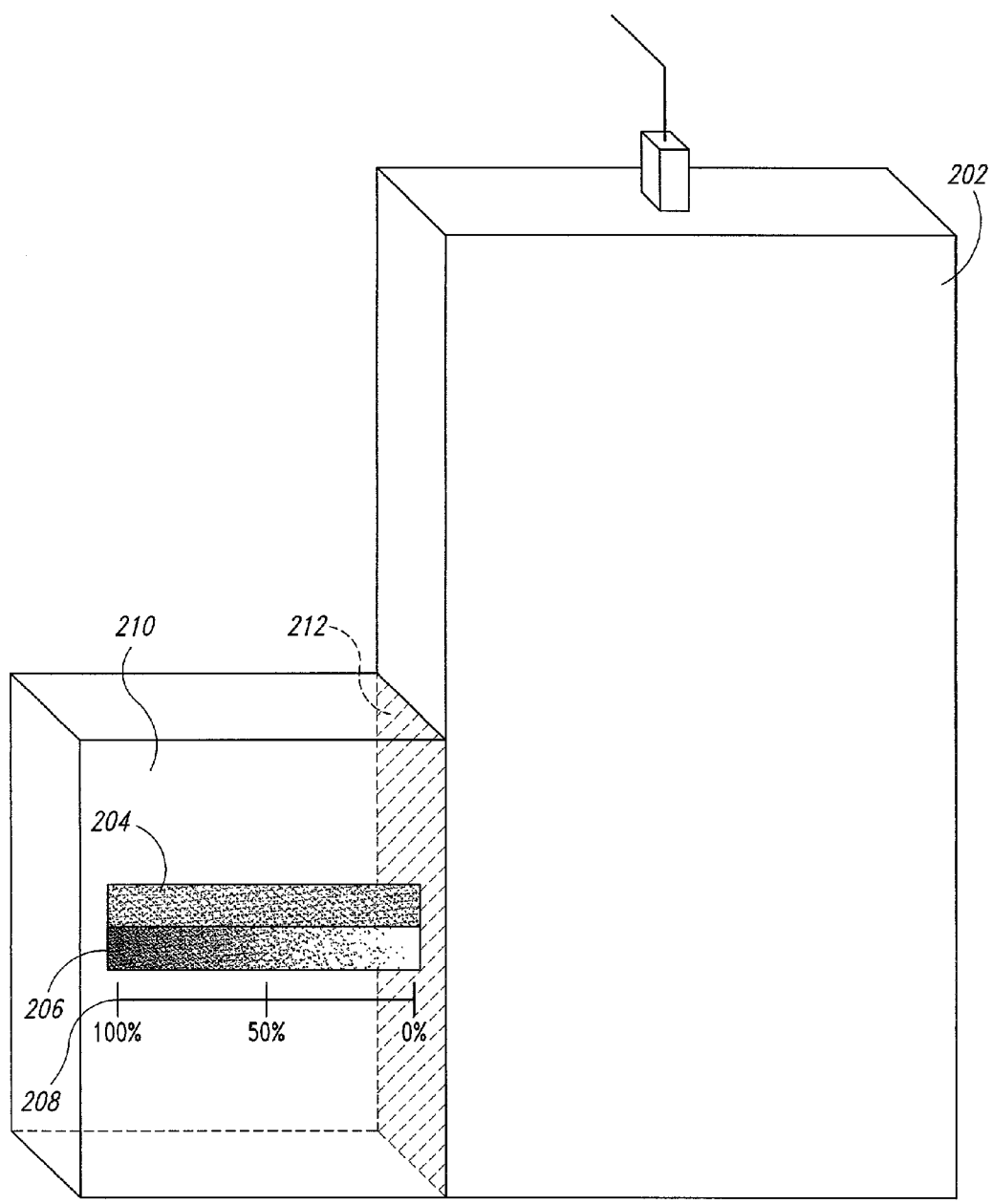
FIG. 2B illustrates a dye chamber with a dye-based fuel indicator separated from the anode reservoir by a membrane.

The dye chamber 210 must be fluid-filled and in fluid contact with the anode reservoir 202. This can be accomplished in any number of ways, depending on the physical characteristics of the fuel cell. Different designs may also be necessary to ensure that the window 204 is visible. FIG. 2B shows the dye chamber 210 separated from the anode reservoir 202 by a semi-permeable membrane 212. This membrane serves to sequester the dye molecules within the dye chamber 210 while still allowing methanol and water to diffuse between the dye chamber 210 and anode reservoir 202. Note that the methanol-water solution in FIG. 2B is around 50% methanol.

Figure 2C:
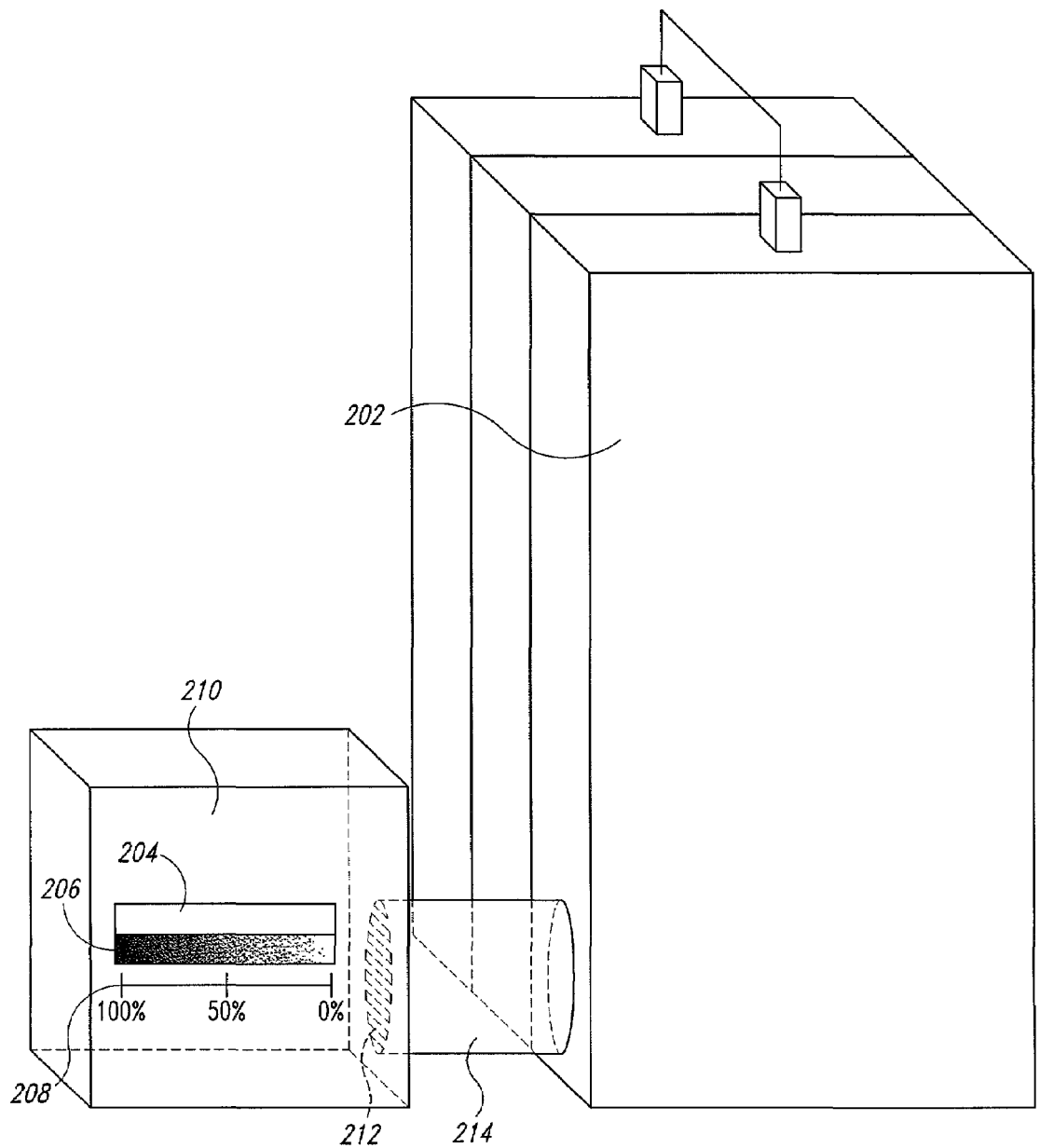
FIG. 2C shows a dye chamber with a dye-based fuel indicator separated from the anode reservoir by a fuel channel and an optional membrane.

FIG. 2C shows an alternate embodiment, in which the dye chamber 210 is separated from the anode reservoir 202 by a fuel channel 214. The fuel channel 214 may have variable lengths and shapes, but must have a cross sectional area large enough to allow for equilibration of the methanol concentration in the anode reservoir 202 with the methanol concentration in the dye chamber 210 within a reasonable time frame. FIG. 2C also shows an optional semi-permeable membrane 212 as described in FIG. 2B. Note that the anode reservoir 202 in FIG. 2C is in a depleted state.

Figure 3A:
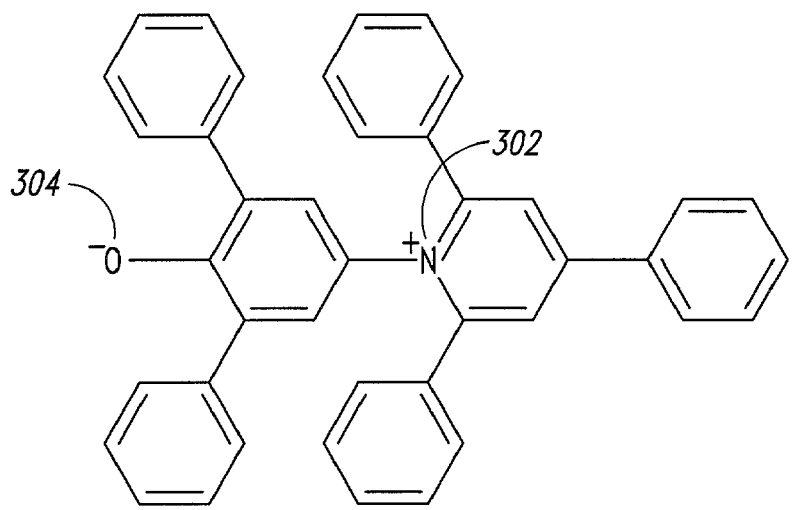
FIG. 3A illustrates an exemplary dye molecule in a ground state.
Figure 3B:
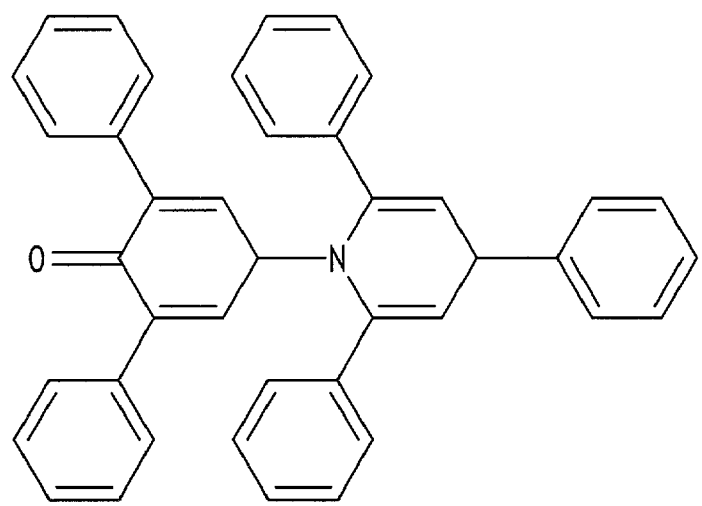
FIG. 3B shows an exemplary dye molecule in an excited state.

FIGS. 3A–B illustrate a general example of a dye molecule changing color in response to a changing condition in the dye molecule's environment. Certain classes of compounds absorb incident light. The color of the light absorbed is related, in these compounds, to a change of internal state from a lower energy state to a higher energy state. The wavelength of reflected light from a solution containing such a compound is enriched in non-absorbed wavelengths. Thus, if a compound absorbs red light, green-colored light may be reflected from the solution, and if a compound absorbs blue light, orange-colored light may be reflected from the solution. In a non-polar solvent, the energy-level difference between the states shown in FIGS. 3A–B is smaller than the energy-level difference in a polar solvent. This particular dye absorbs blue light in a polar solvent and red light in a non-polar solvent, appearing orange is a polar solvent and green in a non-polar solvent.

FIGS. 3A–B show two different states for a Reichardts Dye molecule. FIG. 3A shows the dye molecule in a lower-energy, polar, zwitterionic state containing both a positive charge 302 and a negative charge 304. FIG. 3B shows the same dye molecule in a higher-energy, non-polar state. In polar solvents, the energy difference between the lower-energy state shown in FIG. 3A and the higher-energy state shown in FIG. 3B is larger than in a non-polar solvent, and the dye therefore emits green-colored light in polar solvents and orange-colored light in non-polar solvents.

In this example, the dye responds to a change in dielectric constant of the solution by changing color. However, dyes may respond to other conditions as well, such as the concentration of metal ions or the pH of a solution. In the above-described embodiment of the present invention, the dye responds to a change in methanol concentration.

Figure 4A:
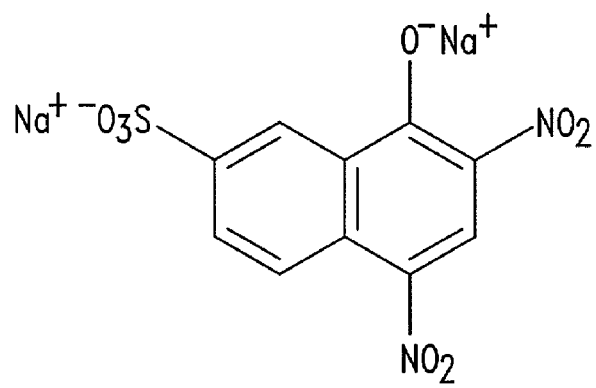
FIG. 4A illustrates the structural formula for Acid Yellow 1.
Figure 4B:
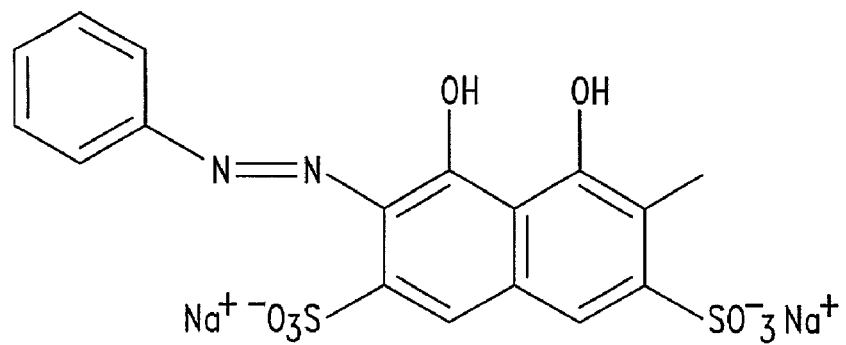
FIG. 4B shows the structural formula for Acid Red 29.

The dye mixture used in a dye-based fuel indicator may also comprise various different dyes. In one embodiment of the present invention, a dye mixture comprising Acid Yellow 1, or Naphthol Yellow S, and Solvent Blue 37 is employed. FIG. 4A illustrates the structural formula for Acid Yellow 1. This dye mixture produces a color gradient with a significant color change at 10% methanol in water. In an alternative embodiment, Acid Red 29, or Chromotrope 2R, is used in combination with Solvent Blue 37 to produce a color gradient with a significant color change occurring between 3% methanol and 1% methanol in water. FIG. 4B shows the structural formula for Acid Red 29. Both embodiments employ 3.5 milligrams of each respective dye combination per milliliter of methanol-water solution. In the above-described embodiments, each dye mixture is dissolved in a series of methanol-water solutions with methanol concentrations between 0.5% methanol in water and pure methanol, to produce a color gradient. Note that many different dye mixtures are possible that produce useful color changes in methanol concentrations present in fuel cells. Moreover, different dye mixtures can be used for indication of the concentration of other hydrogen-rich, liquid fuel sources in other types of fuel cells.

Figure 5:
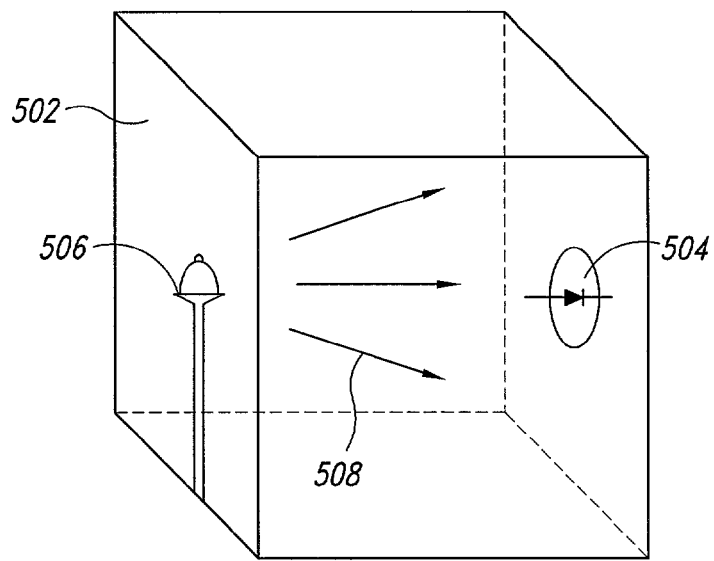
FIG. 5 illustrates an embodiment of the present invention with a photodiode emitter-receiver controlling fuel delivery.

FIG. 5 illustrates an embodiment of the present invention with the dye color controlling the release of the fuel within the cell. FIG. 5 shows a dye-based fuel indicator in direct contact with the anode reservoir 502. The anode reservoir 502 contains a photodiode 504 and a light emitting diode ("LED") 506. The LED 506 shines light 508 upon the photodiode 504 through the methanol-water solution in the anode reservoir 502. The photodiode 504 and LED 506 may employ several methods of operation. At a predetermined methanol level, the color of the methanol-water solution allows enough light 508 from the LED 506 to reach the photodiode 504, activating the photodiode 504. The photodiode 504 produces an electric current that triggers a mechanism to release fuel into the anode reservoir 502. Alternately, at a predetermined methanol level the color of the methanol-water solution ceases to allow enough light 508 from the LED 506 to reach the photodiode 504, activating the photodiode 504. The photodiode 504 produces an electric current that triggers a mechanism to release fuel into the anode reservoir 502. Note that FIG. 5 omits the window, color strip and fuel scale, for clarity of illustration. Note also that FIG.

5 shows the anode reservoir 502 as a different shape than in previous illustrations, for clarity of illustration. Alternative embodiments employ the photodiode 504 and LED 506 in the dye chamber in fluid-communication with the anode reservoir.

Figure 6:
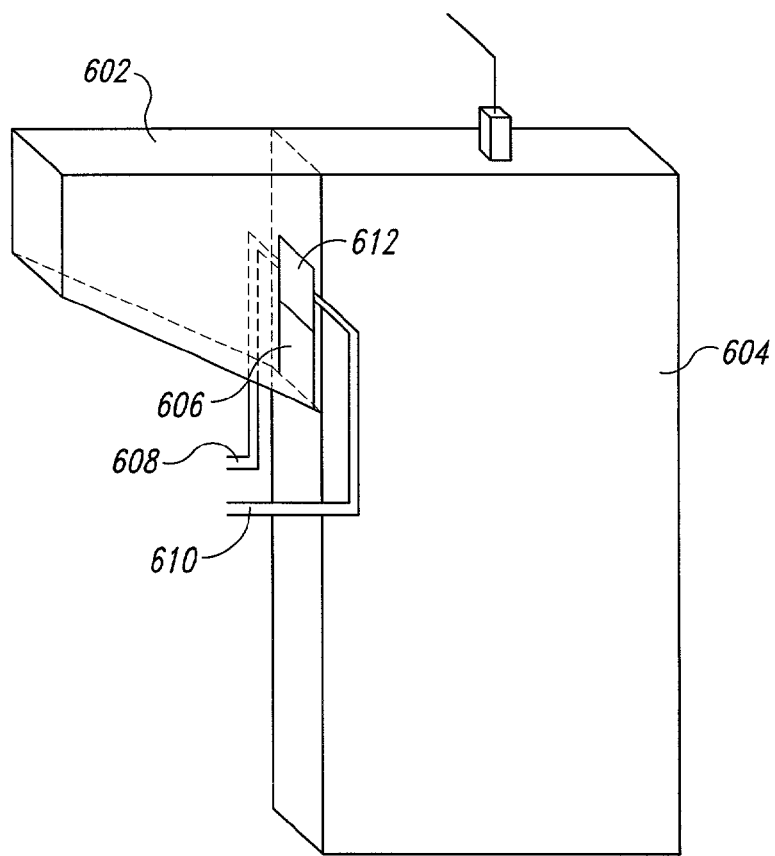
FIG. 6 illustrates one embodiment of a fuel delivery mechanism.

One embodiment of the fuel release mechanism, shown in FIG. 6, comprises a fuel reservoir 602 separated from the anode reservoir 604 by a door 606. The fuel reservoir contains nearly pure methanol without excess water added. Two wires 608,610, extending from the photodiode (504 in FIG. 5) are in contact with a valve 612 that controls the aperture of the door 606. At a predetermined methanol level, the color of the methanol-water solution allows enough light to reach the photodiode to activate the photodiode. An electric circuit is completed that signals the valve 612 to open the door 606. Gravity allows the methanol in the fuel reservoir 602 to be released into the anode reservoir 604. Alternatively, at a predetermined methanol level the color of the methanol-water solution ceases to allow enough light to reach the photodiode, activating the photodiode.

Although the present invention has been described in terms of a particular embodiment, it is not intended that the invention be limited to this embodiment. Modifications within the spirit of the invention will be apparent to those skilled in the art. For example, although two specific dye mixtures are described, there are many different dye mixtures that can be used to produce useful color gradients in response to changing concentrations of different types of fuels. Dye mixtures can encompass a series of dyes that create any number of different color gradients at different fuel concentrations. Dye mixtures can be employed that bring about a significant change in the color of the fuel at different predetermined fuel concentrations. Determination of fuel concentration can be based on dyes reacting with other changing environmental conditions, such as the presence of metal ions or pH to produce color gradients. Many different types of fuel-release systems are possible. The photodiode emitter-receiver can operate with many different electrical control valves or triggers used to actively or passively control the feeding of fuel into the anode reservoir. The photodiode emitter-receiver may be positioned at any location within the fuel solution. Finally, various different shapes, sizes, orientations and positions of the window, color strip and fuel scale may be used. For instance, the color strip may lie beside a vertical window, or wrap around an oblong window. Moreover, the fuel scale need not necessarily lie beneath the color strip. The fuel scale may be incorporated as part of the actual color strip with fuel concentration marks written directly over the colors. Alternatively, the dye chamber may be made entirely from a transparent material with neither a color strip nor a fuel scale.

The foregoing description, for purposes of explanation used specific nomenclature to provide a thorough understanding of the invention. However, it will be apparent to one skilled in the art that the specific details are not required in order to practice the invention. In other instances, well-known portions of fuel cells are shown as diagrams in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments are shown and described in order to best enable others skilled in the art to best utilize the invention and various embodiments with various modifications as are suited to the particular use contemplated. It is intended that the scope of the invention be defined by the following claims and their equivalents:

What is claimed is:

1. A fuel-concentration indicator incorporated in a fuel cell that operates by oxidizing a fuel solution, the fuel-concentration indicator comprising:
   a volume of the fuel solution; and
   a dye or dye mixture with a characteristic wavelength of light absorption or light emission, the characteristic wavelength changing in response to changes in fuel concentration within the volume of the fuel solution.

2. The fuel-concentration indicator of claim 1 wherein the volume of the fuel solution is contained within an anode reservoir containing a transparent window.

3. The fuel-concentration indicator of claim 1 wherein the volume of the fuel solution is contained within a dye chamber containing a transparent window, the dye chamber in fluid contact with the anode reservoir and separated from the anode reservoir by a membrane permeable to the fuel solution but not permeable to the dye mixture.

4. The fuel-concentration indicator of claim 1 wherein the volume of the fuel solution is contained within a dye chamber containing a transparent window, the dye chamber in fluid contact with the anode reservoir and separated from the anode reservoir by a fuel channel.

5. The fuel-concentration indicator of claim 4 further including a membrane permeable to the fuel solution but not permeable to the dye mixture, the membrane between the fuel solution in the anode reservoir and the fuel solution in the dye chamber.

6. The fuel-concentration indicator of claim 1 wherein the dye mixture comprises Acid Yellow 1 and Solvent Blue 37 and responds to methanol concentration within a methanol-water solution by changing color.

7. The fuel-concentration indicator of claim 1 wherein the dye mixture comprises Acid Red 29 and Solvent Blue 37 and responds to methanol concentration within a methanol-water solution by changing color.

8. The fuel-concentration indicator of claim 1, further comprising a photodiode and light-emitting device that illuminate the photodiode by transmitting light through the volume of fuel solution.

9. The fuel-concentration indicator of claim 8, wherein the photodiode and light-emitting device control the release of the fuel solution.

10. The fuel-concentration indicator of claim 1, further comprising a transparent window and a color indicator bar that displays a range of possible colors produced by the dye mixture in response to various fuel concentrations within the volume of fuel solution.

11. The fuel-concentration indicator of claim 10, further comprising a fuel scale, aligned with the color indicator bar.

12. A method for determining the concentration of fuel in a fuel solution in a fuel cell having an anode reservoir, the method comprising:
   adding a dye or dye combination to the fuel solution contained in the anode reservoir with a characteristic wavelength of light absorption or emission, the characteristic wavelength changing in response to a change in fuel concentration within the anode reservoir; and
   determining the concentration of fuel in the fuel solution by comparing the color of the fuel solution containing the added dye mixture to standard colors displayed on a color gradient.

13. The method of claim 12 wherein the dye mixture comprises a combination of Acid Yellow 1 and Solvent Blue 37 and responds to methanol concentration in a methanol-water solution by changing color.

14. The method of claim 12 wherein a dye mixture comprises a combination of Acid Red 29 and Solvent Blue 37 and responds to methanol concentration in a methanol-water solution by changing color.

15. The method of claim 12 wherein determination of the concentration of fuel in the fuel solution is made by inspecting the fuel solution within the anode reservoir through a transparent window incorporated in the anode reservoir.

16. The method of claim 12 wherein determination of the concentration of fuel in the fuel solution is made by inspecting the fuel solution within a dye chamber through a transparent window incorporated in the dye chamber, the dye chamber separated from the anode reservoir by a membrane permeable to the fuel solution but not permeable to the dye mixture.

17. The method of claim 12, wherein determination of the concentration of the fuel in the fuel solution is made by inspecting the fuel solution within a dye chamber through a transparent window incorporated in the dye chamber, the dye chamber in fluid contact with the anode reservoir and separated from the anode reservoir by a fuel channel.

18. The method of claim 17 further including a membrane permeable to the fuel solution but not permeable to the dye mixture, the membrane between the fuel solution in the anode reservoir and the fuel solution in the dye chamber.

19. A fuel-concentration indicator incorporated in a fuel cell that operates by oxidizing a fuel solution, the fuel-concentration indicator comprising:

a volume of the fuel solution; and a chemical-indicator means responsive to fuel concentration within the volume of the fuel solution, the chemical-indicator means having a characteristic wavelength of light absorption or light emission, the characteristic wavelength changing in response to changes of fuel concentration.

* * * * *